United States Patent
Yang et al.

(10) Patent No.: US 8,666,995 B2
(45) Date of Patent: Mar. 4, 2014

(54) METHOD OF GENERATING SEARCH INFORMATION AND IMAGE APPARATUS USING THE SAME

(75) Inventors: Gyung-hye Yang, Seoul (KR); Eun-young Lim, Seoul (KR); Ji-young Kwahk, Seongnam-si (KR); Bong-hyun Cho, Seongnam-si (KR); Sang-woong Hwang, Seongnam-si (KR); Ju-yun Sung, Seoul (KR); Jee-young Her, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1016 days.

(21) Appl. No.: 12/138,578

(22) Filed: Jun. 13, 2008

(65) Prior Publication Data
US 2009/0182721 A1    Jul. 16, 2009

(30) Foreign Application Priority Data
Jan. 11, 2008    (KR) .................. 10-2008-0003385

(51) Int. Cl.
G06F 17/30    (2006.01)
(52) U.S. Cl.
USPC ........................................ 707/751

(58) Field of Classification Search
USPC .............................. 707/654, 752, 751
See application file for complete search history.

(56) References Cited

U.S. PATENT DOCUMENTS

| | | | | |
|---|---|---|---|---|
| 5,708,787 A * | 1/1998 | Nakano et al. | ............... | 715/841 |
| 6,667,751 B1 * | 12/2003 | Wynn et al. | ............... | 715/833 |
| 6,834,130 B1 * | 12/2004 | Niikawa et al. | ............... | 382/305 |
| 7,853,566 B2 * | 12/2010 | Cisler et al. | ............... | 707/654 |
| 2003/0046700 A1 * | 3/2003 | Wilcox et al. | ............... | 725/60 |
| 2005/0076309 A1 * | 4/2005 | Goldsmith | ............... | 715/811 |
| 2006/0190842 A1 * | 8/2006 | Young Suk Lee | ............ | 715/810 |
| 2007/0250711 A1 * | 10/2007 | Storey | ............... | 713/168 |
| 2007/0255767 A1 * | 11/2007 | Kikuchi | ............... | 707/204 |
| 2008/0154915 A1 * | 6/2008 | Flake et al. | ............... | 707/10 |
| 2008/0163127 A1 * | 7/2008 | Newell et al. | ............... | 715/854 |

* cited by examiner

*Primary Examiner* — Jorge A Casanova
(74) *Attorney, Agent, or Firm* — Jefferson IP Law, LLP

(57) ABSTRACT

A method of generating search information enables efficient navigation of content and an image apparatus therefore. The method of generating search information includes extracting and storing a portion of a plurality of searched screens, and generating search information using the stored screens. Accordingly, search information regarding digital content can be generated in a more convenient manner. In addition, since searched screens are generated as search information, search information which enables more efficient navigation can be provided to the user.

30 Claims, 8 Drawing Sheets

METHOD OF GENERATING SEARCH INFORMATION AND IMAGE APPARATUS USING THE SAME

CROSS-REFERENCE TO RELATED APPLICATION

This application claims the benefit of Korean Application No. 2008-3385, filed Jan. 11, 2008, in the Korean Intellectual Property Office, the disclosure of which is incorporated herein by reference.

BACKGROUND OF THE INVENTION

1. Field of the Invention

Aspects of the present invention relate to a method of generating search information and an image apparatus using the same, and more particularly, to a method of generating search information which enables efficient navigation of content and an image apparatus using the same.

2. Description of the Related Art

As digital technology has rapidly developed and has been applied to digital electronic devices, storage space for digital contents, and range and quantity of content used in the digital electronic devices have been expanding exponentially. Recently, due to the widespread distribution of portable electronic devices, users have increased access to many kinds of contents at all places and at all times.

Although the quantity of contents has increased, the size of displays has not matched the increase in the quantity of content due to limitations in display sizes. Therefore, since it is difficult to display all the content used in a digital electronic device on a display of a limited size, the content is displayed in full only by being divided into multiple parts or pages. In order to find a desired content, the user must repeatedly open and close the pages, and is inconvenienced thereby.

In addition, if the user determines that a content item in a page which was previously opened and closed is a closest match to a desired content, the user may not remember how the page was searched or reached, so the user must search various pages again to reach the page containing the desired content or a closest content thereof.

The broader the selection of content that the user has, the more complicated the searching operation of the user becomes. Therefore, there is a need for methods for the user to navigate digital content with greater ease and convenience.

SUMMARY OF THE INVENTION

An aspect of the present invention provides a method of generating search information using screens which have already been searched, and an image apparatus using the same.

According to an aspect of the present invention, a method of generating search information includes extracting images of a portion of a plurality of previously searched screens, storing the extracted images of the plurality of previously searched screens, and generating the search information, which is used in a searching operation, using the stored extracted images of the plurality of previously searched screens.

According to an aspect of the present invention, the search information includes a search history in which the stored extracted images of the plurality of previously searched screens are arranged in an order in which they are searched.

According to an aspect of the present invention, in the extracting operation, an image of a previously searched screen which has a hierarchical relationship with a previous extracted screen is extracted based on screen information contained in the previous extracted screen.

According to an aspect of the present invention, the screen information includes information regarding items which are displayed on the previous extracted screen.

According to an aspect of the present invention, the method further includes receiving a search command, determining if a screen searched according to the search command is similar to at least one of the stored extracted images of the plurality of previously searched screens, and displaying the search information or at least one of the extracted images in the search information, on the screen searched according to the search command if the screen searched according to the search command is similar to the at least one of the extracted images.

According to an aspect of the present invention, the plurality of previously searched screens is screens which are searched using a keyword.

According to an aspect of the present invention, the method further includes storing the generated search information along with the keyword.

According to an aspect of the present invention, in the extracting operation, the portion of the plurality of previously searched screens are extracted in reverse order from a search result screen to an initial search screen.

According to an aspect of the present invention, in the extracting operation, the portion of the plurality of previously searched screens are extracted during a preset period of time preceding a time when a search result screen is extracted.

According to an aspect of the present invention, the extracted screen is a portion of a view of a previously searched screen which is displayed for the longest period of time.

According to another aspect of the present invention, an image apparatus includes a storage unit which stores images of previously searched screens, and a control unit which extracts the images of a portion of a plurality of the previously searched screens, stores the extracted images of the plurality of previously searched screens in the storage unit, and generates search information, which is used in a searching operation, using the stored extracted images of the plurality of previously searched screens.

According to an aspect of the present invention, the search information is information regarding a search history in which the stored extracted images of the plurality of previously searched screens are arranged in an order in which they are searched.

According to an aspect of the present invention, the control unit extracts an image of a previously searched screen which has a hierarchical relationship with a previous extracted screen based on screen information contained in the previous extracted screen.

According to an aspect of the present invention, wherein the screen information includes information regarding items which are displayed on the previous extracted screen.

According to an aspect of the present invention, the image apparatus further includes a user command receiving unit which receives a search command, wherein if the user command receiving unit receives the search command, the control unit compares a screen searched according to the search command with at least one of the stored extracted images of the plurality of previously searched screens, and displays the search information or at least one of the extracted images in the search information, on the screen searched according to the search command if the screen searched according to the search command is similar to the at least one of the extracted images.

According to an aspect of the present invention, the plurality of the previously searched screens is screens which are searched using a keyword.

According to an aspect of the present invention, the control unit stores the generated search information along with the keyword in the storage unit.

According to an aspect of the present invention, the control unit extracts the portion of the plurality of previously searched screens in reverse order from a search result screen to an initial search screen.

According to an aspect of the present invention, the control unit extracts the portion of the plurality of previously searched screens during a preset period of time preceding the time when the search result screen is extracted.

According to an aspect of the present invention, the extracted screen is a portion of a view of a previously searched screen which is displayed for a longest period of time.

According to an aspect of the present invention, a method of generating an image search history of contents from a selected hierarchical sequence of screens displayed on an apparatus includes: extracting respective screen images of the screens in a reverse order of the selected hierarchical sequence; storing the extracted respective screen images after each extraction thereof; and generating the image search history of the contents using the stored respective screen images in the selected hierarchical sequence.

According to an aspect of the present invention, an apparatus used to generate an image search history of contents from a selected hierarchical sequence of screens displayed on the apparatus includes: a display to display the selected hierarchical sequence of screens; a storage unit; and a controller to extract respective screen images of the screens in a reverse order of the selected hierarchical sequence, control storage of the extracted respective screen images after each extraction thereof in the storage unit, and generate the image search history of the contents using the stored respective screen images in the selected hierarchical sequence.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings, of which.

DETAILED DESCRIPTION OF THE EMBODIMENTS

Figure 1:
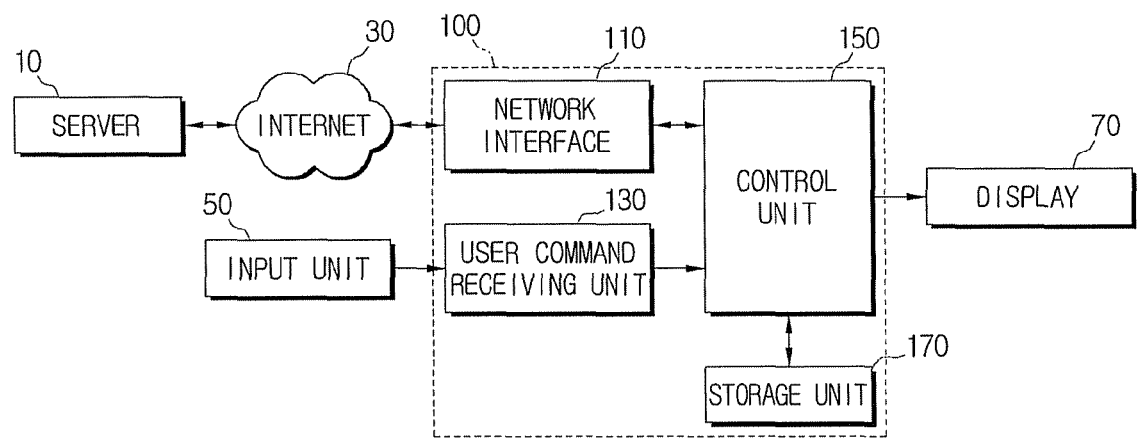
FIG. 1 is a schematic block diagram of a multimedia system including a computer according to an aspect of the present invention.

Reference will now be made in detail to aspects of the present invention, examples of which are illustrated in the accompanying drawings, wherein like reference numerals refer to like elements throughout. The aspects are described below in order to explain the present invention by referring to the figures.

FIG. 1 is a schematic block diagram of a multimedia system including a computer 100 according to an aspect of the present invention. For convenience of description, an external server 10 and the Internet 30 are also illustrated in FIG. 1. As shown in FIG. 1, the multimedia system includes an input unit 50, a display 70, and a computer 100, and is connected to the external server 10 through the Internet 30.

The external server 10 provides a user with content, and a database on the server 10 stores the content to be provided to the user. The input unit 50 receives user commands to operate the computer 100, and may be implemented as a mouse, a keyboard, or others. The display 70 displays images output by the computer 100. In particular, the display 70 displays the content provided from the server 10 to the computer 100, or a web page including the content.

The computer 100 accesses the Internet 30, so the user can search for the content in the database on the server 10. The computer 100 includes a network interface 110, a user command receiving unit 130, a control unit 150, and a storage unit 170. The network interface 110 enables the computer 100 to access the Internet 30, and receives the content from the database on the server 10 through the Internet 30 or transmits data stored on the computer 100. In addition, the network interface 110 may also be implemented to connect the computer 100 to external networks other than the Internet 30.

The storage unit 170 stores data, such as files used in the computer 100, and in particular, stores files related to a multimedia content, including text files, still image files, moving image files, and/or music files. Moreover, the storage unit 170 stores images of screens searched by the user during a search for the content. In particular, among screens searched by the user, the storage unit 170 stores a portion of the images of screens which have a hierarchical or dependent relationship with a resulting search screen, and stores a search history of the searched screens which were visited in order to reach a final search screen.

A hierarchical or dependent relationship refers to one being a hierarchically higher part, and the other being a hierarchically lower part. For example, if there are a screen A and a screen B, and the screen A is hierarchically higher than the screen B, then the screen B is a screen which is linked to one of several items displayed on screen A. Therefore, if the user selects one item displayed on screen A, the control unit 150 operates the display 70 to display the screen B, which is linked to the selected item. Thus, the screen B is a hierarchically lower layer than the screen A, and has a dependent relationship with the screen A.

The search history is search information in which screens having hierarchical relationships with a resulting search screen from among a series of user searched screens are recorded in the order in which they were searched. That is, the search history is search information in which the searched screens are recorded as images instead of being recorded as text. In aspects of the present invention, if searching is performed using keywords, the storage unit 170 stores the keywords with the search history.

As shown in FIG. 1, the control unit 150 controls the overall operation of the computer 100. The control unit 150 searches through contents provided by the server 10 through the network interface 110 according to user commands received by the user command receiving unit 130. Moreover, the control unit 150 operates the display 70 to display contents or web pages, or lists thereof, including content items when searching for a desired content.

The control unit 150 extracts a portion of screens from among the searched screens and transmits the extracted screens to the storage unit 170, and then, the storage unit 170 stores the received screens. In particular, the control unit 150 extracts screens in hierarchical relationship with a search result screen from among the searched screens, and generates a search history using the extracted screens. Detailed description for generating the search history will be given below with reference to FIGS. 2A to 2G.

In addition, the control unit 150 compares a newly searched screen with the screens stored in the storage unit 170 during a search for the desired content according to a user command, and if there is a similar screen, the control unit 150 shows a search history of the similar screen or a portion of screens from the search history, along with the currently searched screen on the display 70. A detailed description thereof will be given below with reference to FIGS. 3A to 3C.

FIGS. 2A to 2G illustrate a process for searching a content and a process for generating a search history. Hereinafter, an operation related to generating the search history is described in detail in sequential order with reference to FIGS. 2A to 2G. For convenience of description, a process of obtaining a desired content is first described in sequential order from FIGS. 2A to 2G, and a process of generating the search history is subsequently described in order from 2G to 2A.

Figure 2A:
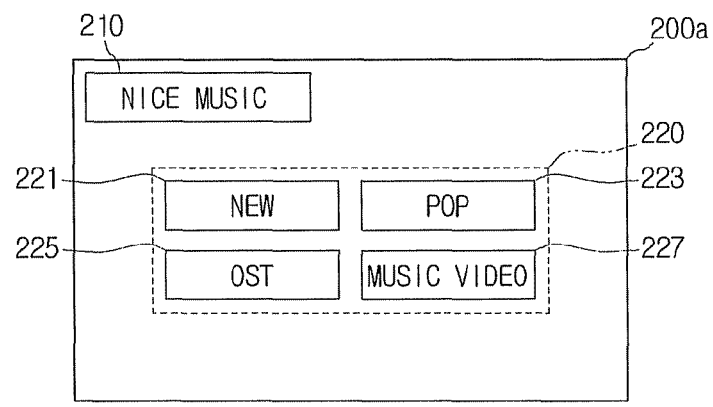
FIGS. 2A to 2G illustrate a process for searching a content and a process of generating a search history.

FIG. 2A illustrates a first screen 200*a* viewable when the user accesses a website named "NICE MUSIC" to search for a music track "Isn't she lovely?" by Stevie Wonder, for example. When the computer 100 accesses the server 10 through the Internet 30, the control unit 150 controls receipt of such a webpage from the server 10.

On the screen 200*a*, a title of the current website "NICE MUSIC" 210 and menu items 220 classified according to a certain (or predetermined) basis are shown. The menu items 200 include a "NEW" item 221 to provide new music, a "POP" item 223 to provide pop music, an "OST" item 225 to provide film music or an original soundtrack music, and a "MUSIC VIDEO" item 227 to provide music videos. If the user selects one of the menu items 221, 223, 225, or 227 using the input unit 50, the control unit 150 controls receipt of a webpage linked to the selected item from the server 10, and displays a resulting webpage on the display 70.

Figure 2B:
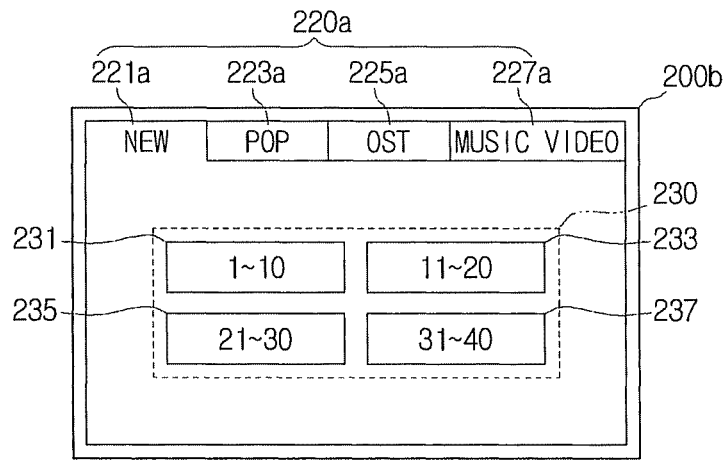

FIG. 2B illustrates a screen 200*b* that is output when the user selects the NEW item 221 on the screen 200*a* of FIG. 2A. Tabs for the items 220 classified according to the certain basis are shown on the upper part of the screen 200*b*, and hierarchically lower items 230 of the selected item are displayed at the center of the screen 200. As shown, the item tabs 220 include a NEW item tab 221*a*, the POP item tab 223*a*, the OST item tab 225*a*, and the MUSIC video item tab 227*a*, and are provided to be selected by the user.

In FIG. 2B, the NEW item tab 221*a* is integrally shown with a list of hierarchically lower items 230, unlike non-selected item tabs 223*a*, 225*a*, and 227*a*, so the user can recognize which hierarchically higher item is selected. Furthermore, the user can recognize a hierarchical relationship for the currently displayed screen and the previously displayed screen. That is, the user can notice that the screen 200*b* of FIG. 2B is subordinate or dependent to the screen 200*a* of FIG. 2A by viewing the item tabs 220*a* on the upper part of the screen 200*b* of FIG. 2B. The user can change the screen 200*b* by selecting one of the other non-selected item tabs 223*a*, 225*a*, and 227*a*.

As shown in FIG. 2B, the hierarchically lower items 230 of the NEW item tab 221*a* include a "1~10 item 231 to search for music ranked from number 1 to number 10, an "11~20 item 233 to search for music ranked from number 11 to number 20, a "21~30 item 235 to search for music ranked from number 21 to number 30, and a "31~40 item 237 to search for music ranked from number 31 to number 40, which are classified according to a predetermined ranking of the music. If the user selects one of the items 230 using the input unit 50, the control unit 150 controls receipt of a webpage linked to the selected item from the server 10, and displays the resulting webpage on the display 70.

Figure 2C:
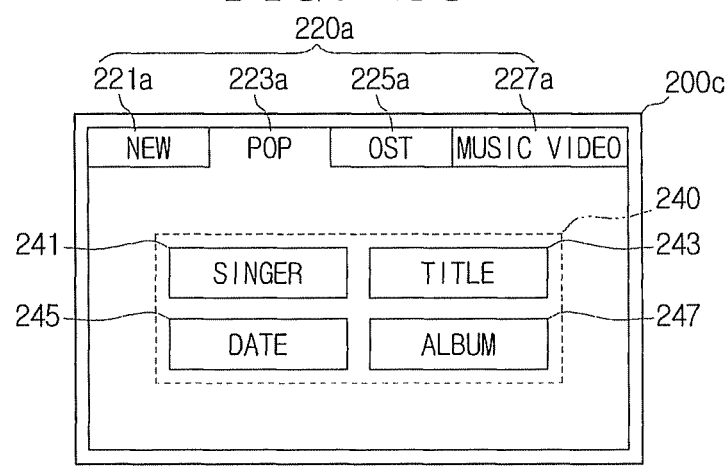

FIG. 2C illustrates a screen 200*c* that is output when the user selects the POP item 223 on the screen 200*a* of FIG. 2A, or selects the POP item tab 223*a* on the screen 200*b* of FIG. 2B. In particular, since FIGS. 2A to 2F are displayed in sequential order, FIG. 2C shows the screen 200*c* that is displayed so that the user can continue searching when he or she cannot find a desired music from screen 200*a* of FIG. 2A related to the NEW item 221 or the screen 200*b* of FIG. 2B related to the "1~10 item 231, the "11~20 item 233, the "21~30 item 235, and the "31~40 item 237.

As shown in FIG. 2C, tabs 221*a*-227*a* for the items tabs 220*a* classified according to the certain basis are shown on the upper part of the screen 200*c*, and hierarchically lower items 240 of a selected item are displayed on the center of the screen 200*c*. The item tabs 220*a* include the NEW item tab 221*a*, the POP item tab 223*a*, the OST item tab 225*a*, and the MUSIC video item tab 227*a*, and are provided to be selected by the user.

The POP item 223 selected in FIG. 2A (corresponding to the POP item tab 223*a* as shown in FIG. 2C) is integrally shown in FIG. 2C with a list of hierarchically lower items 240, unlike the non-selected item tabs 221*a*, 225*a*, and 227*a* of FIG. 2C, so the user can recognize which of the higher item tabs is selected. Furthermore, the user can recognize a hierarchical relationship for a currently displayed screen (i.e., 200*c*) and a previously displayed screen (i.e., 200*a*).

The hierarchically lower items 240 of the POP item 223 (or the POP item tab 223*a*) include a "singer" item 241 to search for music according to a singer, a "TITLE" item 243 to search for music according to a title, a "DATE" item 245 to search for music according to a date on which it was launched or released, and an "ALBUM" item 247 to search for music according to an album which it is from, which are classified according to the certain basis for searching. If the user selects one of the items 240 using the input unit 50, the control unit 150 controls receipt of a webpage linked to the selected item from the server 10, and displays the resulting webpage on the display 70.

Figure 2D:
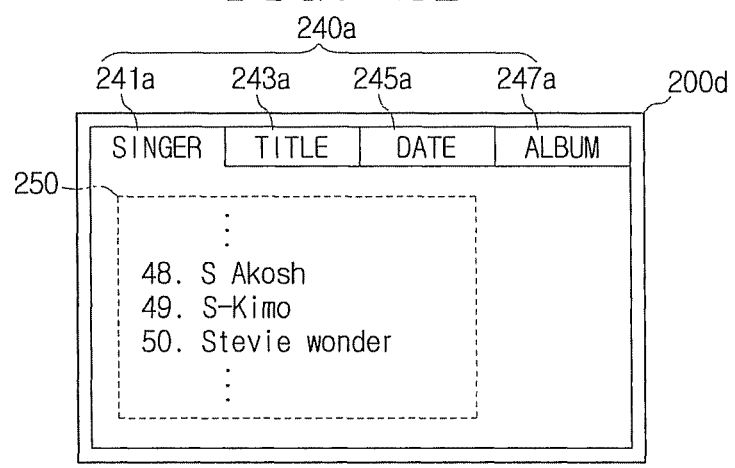

FIG. 2D illustrates a screen output when the user selects the SINGER item 241 on the screen 200*c* of FIG. 2C. Tabs for the items 240 classified according to the certain basis for searching are shown on the upper part of the screen 200*d*, and lower items 250 of a selected singer item 241 (or singer item tab 241*a*) are displayed on the center of the screen 200*d*. Item tabs 240*a* include a SINGER item tab 241*a*, a TITLE item tab 243*a*, a DATE item tab 245*a*, and an ALBUM item tab 247*a*.

In FIG. 2D, the item 241 selected in FIG. 2C is integrally shown as the SINGER item tab 214*a* with a list of hierarchically lower items 250, unlike the non-selected item tabs 243*a*, 245*a*, and 247*a*, so the user can recognize which higher item is selected. Furthermore, the user can recognize a hierarchical relationship between a currently displayed screen (i.e., 200*d*) and a previously displayed screen (i.e., 200*c*).

The hierarchically lower items 250 of the SINGER item 241 (or SINGER item tab 241*a*) include a list of singer's names to be searched for by name, in which the singer's names may be displayed in alphabetical order. The user selects a desired item "50. Stevie Wonder" from the singer's names using the input unit 50, then the control unit 150 controls receipt of a webpage linked to the selected item from the server 10, and controls display of the resulting webpage on the display 70.

Figure 2E:
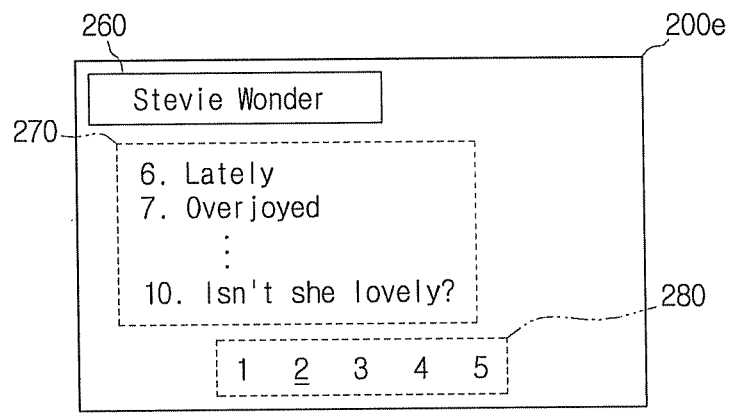

FIG. 2E illustrates a screen output when the user selects the item "50. Stevie Wonder" on the screen 200*d* of FIG. 2D. In particular, FIG. 2E illustrates a second webpage of the item "50. Stevie Wonder" from among webpages listed under the selected item "50. Stevie Wonder". The second webpage of the item "50. Stevie Wonder" is shown because the first webpage did not contain the desired content when the user viewed the first webpage, for example.

An item "Stevie Wonder" 260, which is being searched, is shown on the upper part of the screen 200*e*, and lower items 270 regarding music titles which are provided by the selected webpage are displayed in the center of the screen 200*e*. In addition, reference numbers 1 through 5 of webpages under item "Stevie Wonder" 260 are displayed on the lower part of the screen 200*e*, in which a reference number 2 of a currently viewed webpage is highlighted. Accordingly, the user can recognize that the second webpage 2 under item "Stevie Wonder" 260 is being displayed.

In FIG. 2E, if the user selects a desired track "10. Isn't she lovely?" from among the displayed music titles, the control unit 150 controls receipt of content linked to the selected item from the server 10 and controls the display of the content thereof on the display 70.

Figure 2F:
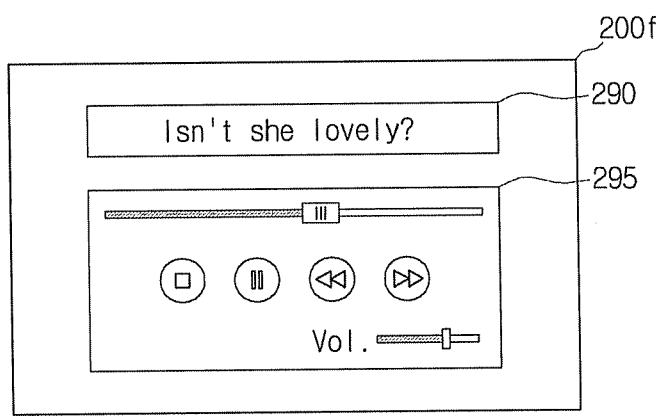

FIG. 2F illustrates a music player shown on the display 70 when the user selects the desired track "10. Isn't she lovely?". The screen 200*f* includes a title of the desired track "Isn't she lovely?" 290, and the music player 295 having various controls. Following the above process, the user can obtain the desired content.

Hereinafter, a process of the control unit 150 to generate a search history when searching is performed by the process from FIG. 2A to FIG. 2F will be described with reference to FIGS. 2A to 2F in order. The control unit 150 first extracts a final search result screen, that is, the screen 200*e* of FIG. 2E, and stores the screen 200*e* in the storage unit 170. Subsequently, the control unit 150 extracts a screen which is closest, adjacent, or sequential to the final search result screen 200*e* from among the screens shown on the display 70 while performing the searching operation using (or based on) screen information displayed on the extracted search result screen 200*e*.

The screen information is information on the items displayed on the screen 200*e*, so the screen information displayed on the final search result screen 200*e* indicates or is the Stevie Wonder item 260, the items 270 regarding the five music titles, and the items 280 regarding the reference numbers of the webpages under the Stevie Wonder item 260, which are displayed in the final search result screen of FIG. 2E. In other words, the control unit 150 can extract a screen which is closest, adjacent, or sequential to the final search result screen 200*e* from among the screens shown on the display 70 using the Stevie Wonder item 260, the items 270 regarding the five music titles, and the items 280 regarding the reference numbers of the webpages from the final search screen 200*e*.

Comparing the screens shown on the display 70 while the search was performed with the Stevie Wonder item 260, the items 270 regarding the five music titles, and the items 280 regarding the reference numbers of the webpages of the final search result screen 200*e*, the "50. Stevie Wonder" item on the list 250 of singer names at the center of FIG. 2D is similar to the Stevie Wonder item 260 at the upper part of FIG. 2E.

Therefore, the control unit 150 determines that the screen 200*d* of the FIG. 2D is one that is closest, adjacent, or sequential to the screen 200*e* of FIG. 2E based on the Stevie Wonder item 260, and determines that the screen 200*e* of FIG. 2E is subordinate to the screen 200*d* of the FIG. 2D. Thus, the screen which is closest, adjacent, or sequential to the screen 200*e* of FIG. 2E in the end is a dependent screen.

Since the screen 200*d* of FIG. 2D is closest to the screen 200*e* of FIG. 2E, the control unit 150 extracts the screen 200*d* of FIG. 2D and further stores the screen 200*d* in the storage unit 170. In this case, since the screen 200*f* of FIG. 2F displaying a music player 295 is shown on the display 70 using a separate window, and is not a final search result screen, the screen 200*f* of FIG. 2F is excluded from the process of generating a search history.

However, in other aspects of the present invention, it is possible to consider the screen 200*f* of FIG. 2F as a final search result screen and allow screen 200*f* to be included in the process of generating a search history. In this case, in like manner as discussed above, the screen 200*e* of FIG. 2E is determined to be the closest or adjacent to the screen 200*f* of FIG. 2F based on the item 290 "Isn't she lovely?" of FIG. 2F, so that the screen 200*d* of FIG. 2E is extracted based on screen information from the screen 200*f* of FIG. 2F, and the screen 200*d* of FIG. 2D is extracted based on screen information from the screen 200*e* of FIG. 2E.

FIG. 2D omits a remainder of the singers 250 except for "48. S Akosh" to "50. Stevie Wonder". When the screen 200*d* cannot display all the items 250, some of the items 250 can be divided into a plurality of pages and displayed as in item 280 of FIG. 2E. Otherwise, the items 250 can be displayed on a single page as in FIG. 2D. In FIG. 2D, all the items are displayed on one page, but items may be limited. Thus, the user may search for the desired item by scrolling the list item 250 up or down, during which a screen that is held and displayed for the longest period of time can be assumed to be the desired screen for extraction and/or storage. Therefore, when extracting a searched page that is scrollable, the control unit 150 extracts a portion of the screen (or a portion of a view of the screen) that is displayed for the longest period of time.

With reference to FIG. 2D, the control unit 150 extracts a screen which is closest to the extracted screen 200*d* from among the screens shown in the display 70 while performing the searching operation using the screen information displayed on the extracted screen 200*d* of FIG. 2D. In this case, the control unit 150 extracts the screen 200*c* of FIG. 2C using the SINGER item tab 241*a* of FIG. 2D and stores the screen 200*c* of FIG. 2C in the storage unit 170, and likewise extracts the screen 200*a* of FIG. 2A using the POP item tab 223*a* of FIG. 2C and stores the screen 200*c* of FIG. 2C in the storage unit 170.

The screen 200*b* of FIG. 2B displays the item list 230 in which items are classified according to the predetermined basis for searching corresponding to the NEW item 221 (or the new item tab 221*a*), so there is no similarity between the items on the screen 200*b* of FIG. 2B and the items on the screen 200*d* of FIG. 2D. Accordingly, the control unit 150 does not extract the screen 200*b* of FIG. 2B using the items displayed on the screen 200*d* of FIG. 2D.

According to the above, the control unit 150 sequentially extracts the screen 200*e* of FIG. 2E, the screen 200*d* of FIG. 2D, the screen 200*c* of FIG. 2C, and the screen 200*a* of FIG. 2A, and stores them in the storage unit 170. In other aspects of the present invention, the extraction of the screens may proceed as the content is searched, rather than after the search is completed and the final search screen is reached as discussed above.

In aspects of the present, instead of extracting a portion of the screens which are searched from the final search result screen to the initial search screen in reverse sequential order, it is also possible to extract a portion of the screens which were searched only during a preset period of time preceding the time when the final search result screen is extracted. This is because screens which were searched a long time ago may be inappropriate to be included in the search history and provided to the user. For example, if the user sets the preset period of time as 10 minutes, the control unit 150 extracts screens which were searched and/or displayed within 10 minutes of extracting the final search result screen, and does not extract a screen which was searched and/or displayed after 10 minutes of extracting the final search result screen since the screen that was search more than 10 minutes ago may be a screen which was displayed or searched when the user was searching for a different desired item.

Based on the above, the control unit 150 generates a search history using the stored and/or extracted screens. The search history is search information in which a series of screens that was searched by the user are recorded as described above, so that images of searched screens are recorded and constitute the search history. Further, the control unit 150 stores the generated search history in the storage unit 170. In this aspect of the present invention, since the searching operation has been performed without using keywords, there are no keywords to be stored. However, in other aspects of the present invention, if searching is performed using keywords, the keywords may be stored with the image search history in the storage unit 170.

Figure 2G:
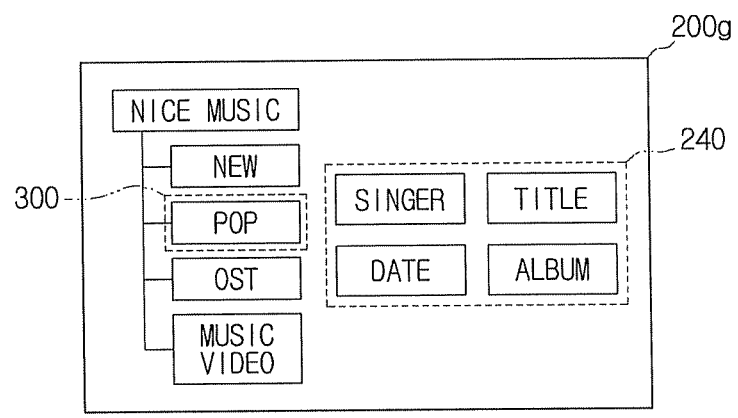

FIG. 2G illustrates an alternate screen output on the display 70 corresponding to FIG. 2C the user may use to select a POP item 300 to find a desired music. Accordingly, in aspects of the present invention, a screen 200g of FIG. 2G may be displayed on the display 70 instead of the screen 200c of FIG. 2C. This signifies that the menu items, such as 240, can be displayed in the form of a tab as in FIG. 2C, or in the form of a tree as in FIG. 2G. In FIG. 2G, the menu items classified according to the certain basis are shown in the form of a tree on the left of the screen 200g, and lower items 240 of a selected menu item are displayed on the right of the screen 200g.

Among the menu items in the form of the tree on the left of the screen 200g, the POP item 300 selected by the user is highlighted with a broken line box, for example, so the user can recognize which menu item is currently selected, and to also enable recognition of the hierarchical relationship between a currently displayed screen 200g and a previously displayed screen, such as 200a, for example. Since the screen 200g of FIG. 2G includes a NEW item branch, a POP item branch, an OST item branch, and a MUSIC video item branch, the screen 200a of FIG. 2A is determined to be the closest, adjacent, or sequential to the screen 200g of FIG. 2G when performing extraction.

This aspect is merely an example for convenience of description, and the technical idea of the present invention can be applied to the menu items in diverse forms other than the tab form and the tree form.

Figure 3A:
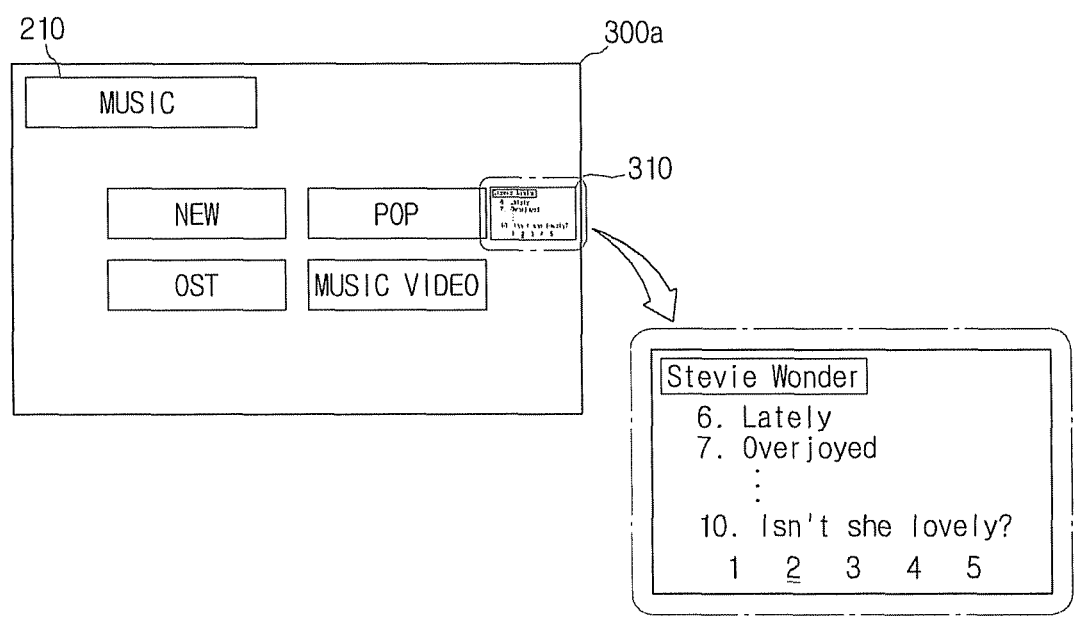
FIGS. 3A to 3C illustrate screens displayed when there is a subsequent user's search command after the user searches for a desired content via the process shown in FIGS. 2A to 2F and a control unit stores the search history.
Figure 3B:
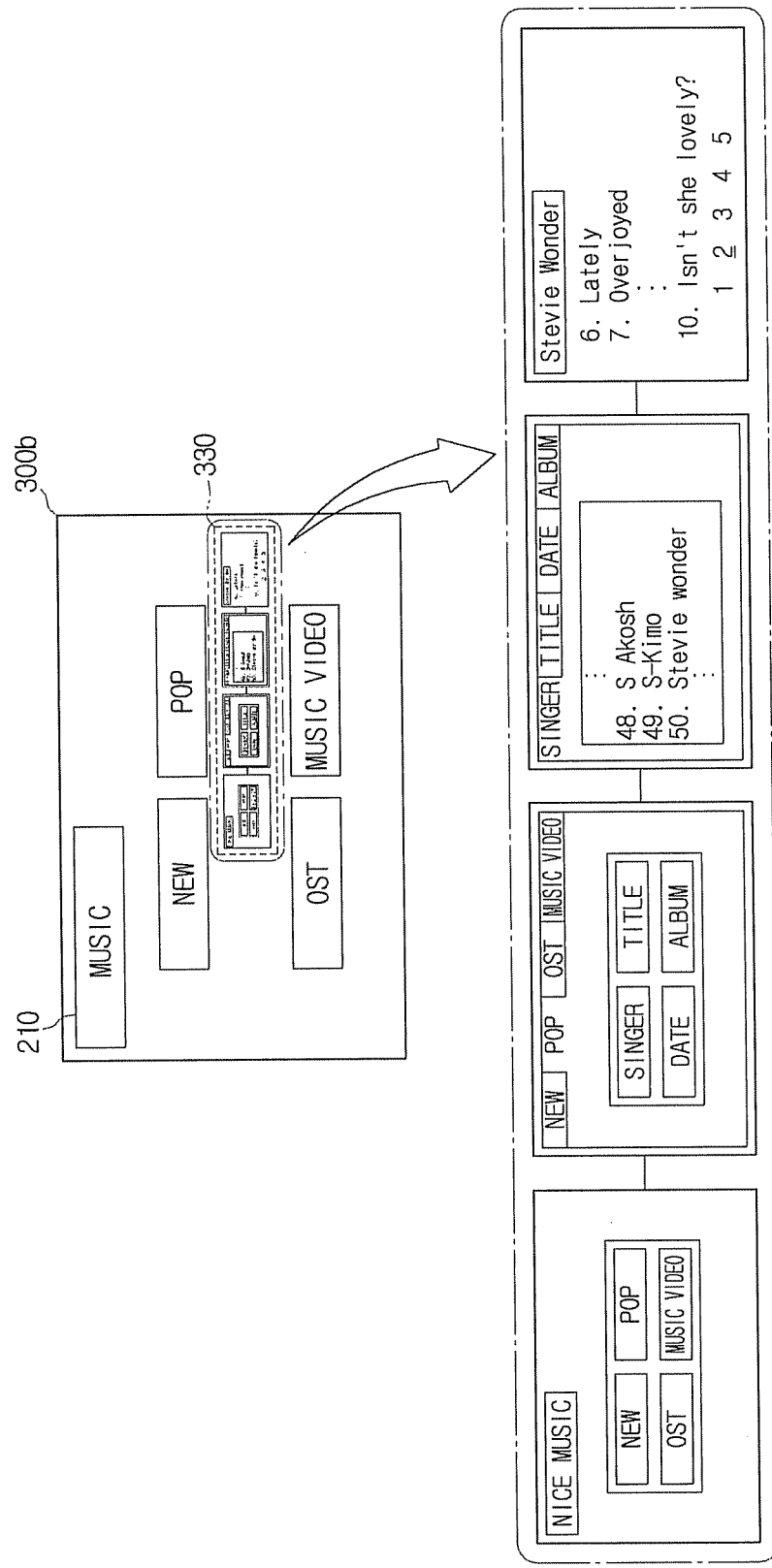
Figure 3C:
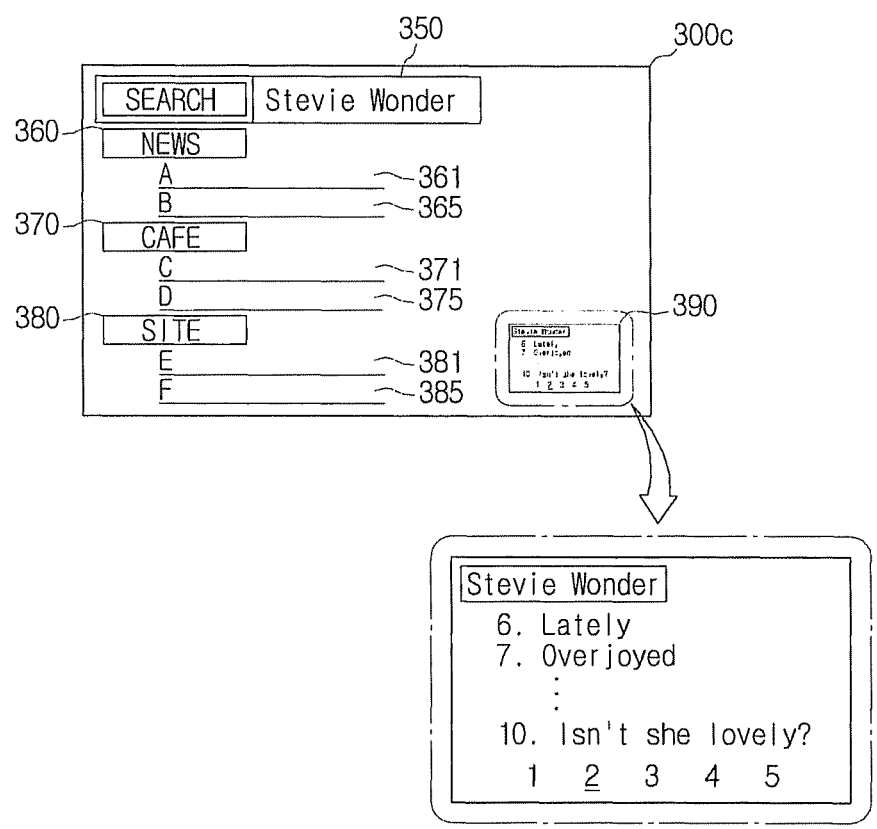

Hereinafter, the process of outputting the search history on the display 70 is described in detail with reference to FIGS. 3A to 3C. FIGS. 3A to 3C illustrate screens displayed when the user inputs a search command after the user performs the search for a desired content using the process shown in FIGS. 2A to 2F and the control unit 150 stores the search history in the storage unit 170.

If the user inputs a search command, the control unit 150 extracts an initial search screen to start a searching operation according to the search command, and determines whether a screen from among the pre-stored screens of an image search history is similar to the initial search screen. If a screen from among the pre-stored screens is similar to the initial search screen, the search history of the similar screen or a portion of screens in the search history of the similar screen is shown along with the currently searched screen on the display 70. In particular, the control unit 150 displays the search history of the similar screen or a portion of screens the search history of the similar screen, which is determined to be similar to a portion of screens in the search history, at a location near an item in the currently searched screen.

FIG. 3A illustrates a screen 300a in which a reduced screen 310 of the screen 200e of FIG. 2E as an image search history is added to the right of a "POP" item. That is, in FIG. 3A, a screen (for example, 310) in the image search history, which is determined to be similar to a currently searched screen (for example, 300a), is displayed along with the currently searched screen 300a on the display 70.

FIG. 3B illustrates a screen 300b in which reduced screens 330 of screens 200a, 200c, 200d, and 200e, respectively, of FIGS. 2A, 2C, 2D, and 2E are added (or displayed) under the POP item. That is, in FIG. 3B, the image search history which is determined to be similar to a currently searched screen (for example, 300b) is displayed along with the currently searched screen 300b on the display 70.

In FIG. 3C, when performing a search using keywords, a screen (for example, 390) in the image search history which is determined to be similar to a currently searched screen (for example, 300c) is displayed along with the currently searched screen 300c on the display 70.

In FIG. 3C, if the user inputs a search command using a keyword "Stevie Wonder", the control unit 150 extracts an initial search screen 300c to start searching according to the search command and determines if a screen from among the pre-stored screens of the image search history is similar to the initial search screen 300c. As shown in FIG. 3C, the initial search screen 300c includes a "NEWS" item 360, a "CAFE" item 370, and a "SITE" item 380.

Under the "NEWS" item 360, items regarding news content such as "A" 361 and "B" 365 are displayed. Under the "CAFE" item 370, items regarding cafe content such as "C" 371 and "D" 375 are displayed. Under the "SITE" item 380, items regarding website content such as "E" 381 and "F" 385 are displayed. Accordingly, the control unit 150 determines if any of the pre-stored screens of the image search history are similar to each of the items 361, 365, 371, 375, 381, and/or 385, and displays a screen in the search history of the similar screen to the right of the similar item, for example, "E" on the screen 300c of the display 70. Therefore, the user can search for desired content more conveniently and rapidly.

Figure 4:
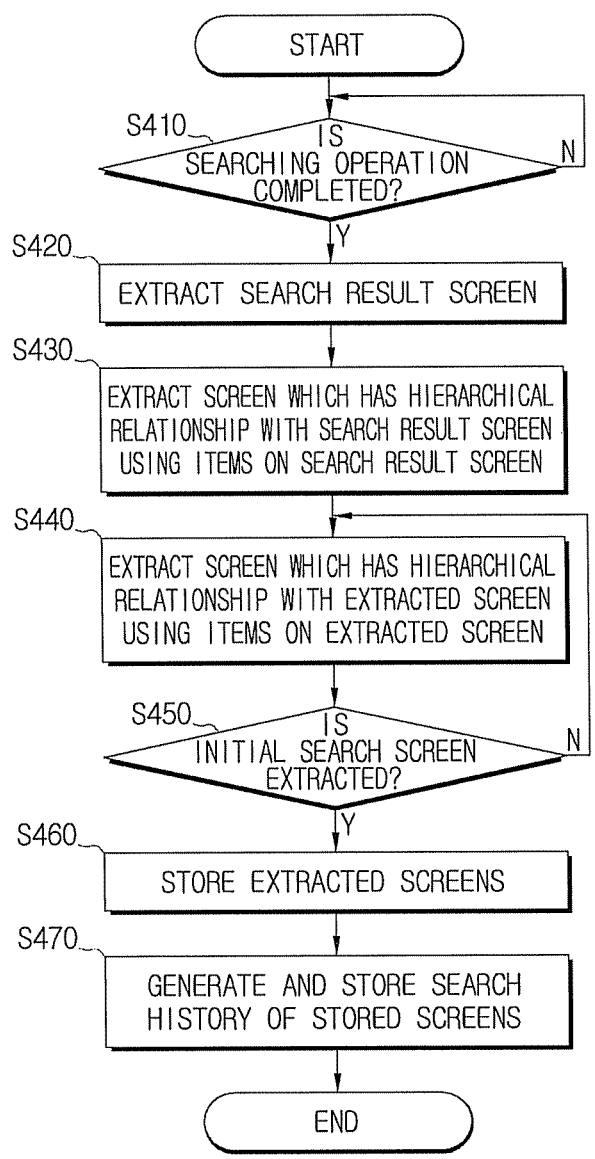
FIG. 4 is a flow chart of a method of generating search information according to an aspect of the present invention.

FIG. 4 is a flow chart of a method of generating search information according to an aspect of the present invention. The control unit 150 determines if a searching operation is completed (operation S410). If the searching operation is completed (Y in operation S410), the control unit 150 extracts a search result screen (operation S420).

The control unit 150 extracts a screen which has a hierarchical relationship with the extracted search result screen using items on the extracted search result screen (operation S430). The control unit 150 extracts a screen which has the hierarchical relationship with the screen extracted in operation of S430 using items from the extracted screen (operation S440).

The control unit 150 determines if an initial search screen is extracted (operation S450). If the initial search screen is not extracted (N in operation S450), operation of S440 is repeated until the initial search screen is extracted. If the initial search screen is extracted (Y in operation S450), the control unit 150 stores the extracted screens in the storage unit 170 (operation S460). Subsequently, the control unit 150 generates a search history of the stored screens and stores the generated history in the storage unit 170 (operation S470).

Figure 5:
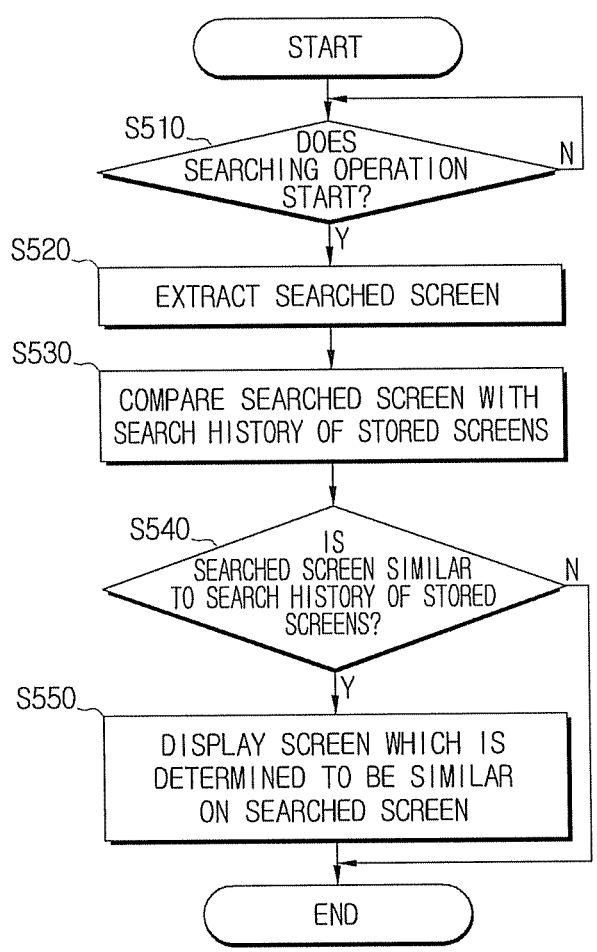
FIG. 5 is a flow chart of a process of outputting search history when performing searching operation using generated search information.

FIG. 5 is a flow chart of a process of outputting a search history when performing a searching operation using generated search information. The control unit 150 determines if the user inputs a search command (operation S510). If the searching operation starts (Y in operation S510), the control unit 150 extracts an initial search screen (operation S520).

The control unit 150 compares the initial search screen with the search history of the screens stored in the storage unit 170 (operation S530). As a result of comparison, if the initial search screen is similar to the history of the screens stored in the storage unit 170 (Y in operation S540), the control unit 150 overlaps on the initial search screen a part or all of the screens in the search history of a screen which is determined to be similar to be the initial search screen (operation S550).

In aspects of the present invention, content may also refer to any audio/video data, multimedia data, text, graphics, images, or other audio and/or visual data. Aspects of the present invention are applicable to any such types of contents.

In aspects of the present invention, extraction of the screens may refer to screen capture and/or other method of obtaining graphical or image representation of the screens.

In aspects of the present invention, search history may also refer to image search history, and the image search history may be created automatically once the search is completed or when a command to create the search history is received.

In various aspects, and/or refers to alternatives chosen from available elements so as to include one or more of the elements. For example, if the elements available include elements X, Y, and Z, and/or refers to X, Y, Z, or any combination thereof.

In the aspect of the present invention, a multimedia system including a computer connected to a server through the Internet is employed, but this is merely an example for convenience of description. Accordingly, the technical idea of the aspects of the present invention can be applied to any kind of system or apparatus containing a plurality of content items or files even if the system or apparatus is not connected to the Internet or does not include a computer.

In the aspect of the present invention, screens are extracted and stored in reverse order while a search history is being generated instead of while the user is searching for desired content, but this is merely an example for convenience of description. Accordingly, it is also possible to extract and store screens in normal order whenever a screen is changed while the user is searching for desired content.

In the aspect of the present invention, a search history is generated in reverse order from that of an order of a search, but this is merely an example for convenience of description. Accordingly, the technical idea of the aspects of the present invention can be applied even when a search history is generated in an order other than the reverse order.

In the aspect of the present invention, when a single webpage is long, a screen displayed for the longest period of time is extracted and stored. However, it is also possible to select a screen to be extracted and stored in different methods by defining a different basis.

In the aspect of the present invention, a search history is generated by extracting all the screens which have the hierarchical relationship, but it is also possible to generate a search history by extracting a portion of the screens which have the hierarchical relationship.

In an aspect of the present invention, a search history is generated by extracting a portion of the screens which are searched from a search result screen to an initial search screen or extracting a portion of the screens which are searched during a preset period of time preceding the time when the search result screen is extracted, but this is merely an example for convenience of description. Accordingly, it is also possible to generate a search history in different extraction manners, for example, by extracting the latest three screens from the search result screen.

As described above, according to aspect of the present invention, search information regarding digital content can be generated in a more convenient manner. In addition, since searched screens are generated as search information, search information which enables more efficient navigation can be provided to the user.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A method of generating search information of content from screens displayed on a display of an apparatus, the method comprising:
    extracting respective screen images of at least a portion of a plurality of previously searched screens;
    storing the extracted images of the plurality of previously searched screens after each extraction thereof;
    generating the search information, of the content using the stored extracted images;
    in a subsequent search, comparing image content of search screens of the subsequent search with content in the search information; and
    if the image content of the search screens of the subsequent search are similar to the content in the search information, displaying the search information including respective screen images similar to image contents of the subsequent search screens.

2. The method according to claim 1, wherein the search information comprises a search history in which the stored extracted images of the plurality of previously searched screens are arranged in an order in which they are searched.

3. The method according to claim 1, wherein the extracting of the images includes extracting an image of a previously searched screen which has a hierarchical relationship with a previous extracted screen based on screen information contained in the previous extracted screen.

4. The method according to claim 3, wherein the screen information comprises information regarding items which are displayed on the previous extracted screen.

5. The method according to claim 1, further comprising:
    receiving a search command;
    determining if a screen searched according to the search command is similar to at least one of the stored extracted images of the plurality of previously searched screens; and
    displaying the search information or at least one of the extracted images in the search information, on the screen searched according to the search command if the screen searched according to the search command is similar to the at least one of the extracted images.

6. The method according to claim 1, wherein the plurality of previously searched screens comprises screens which are searched using a keyword.

7. The method according to claim 6, further comprising:
   storing the generated search information along with the keyword.

8. The method according to claim 1, wherein the extracting of the images includes extracting the portion of the plurality of previously searched screens in reverse order from a search result screen to an initial search screen.

9. The method according to claim 1, wherein the extracting of the images includes extracting the portion of the plurality of previously searched screens during a period of time preceding a time when a search result screen is extracted.

10. The method according to claim 1, wherein the extracting of the images include extracting a portion of the previously searched screens which is displayed for a longest period of time.

11. An image apparatus to generate search information of contents from previously searched screens displayed on a display of the apparatus, the apparatus comprising:
   a storage unit which stores images of the previously searched screens; and
   a control unit which extracts the images of at least a portion of a plurality of the previously searched screens, stores the extracted images of the plurality of the previously searched screens in the storage unit after each extraction thereof, generates search information of the contents using the stored extracted images of the plurality of the previously searched screens, compares in a subsequent search image contents of search screens of the subsequent search with contents in the search information, and, if the image contents of the search screens of the subsequent search are similar to the contents in the search information, displays the search information including respective screen images similar to image contents of the subsequent search screens.

12. The apparatus according to claim 11, wherein the search information comprises information regarding a search history in which the stored extracted images of the plurality of the previously searched screens are arranged in an order in which they are searched.

13. The apparatus according to claim 11, wherein the control unit extracts an image of a previously searched screen which has a hierarchical relationship with a previous extracted screen based on screen information contained in the previous extracted screen.

14. The apparatus according to claim 13, wherein the screen information comprises information regarding items which are displayed on the previous extracted screen.

15. The apparatus according to claim 11, further comprising:
   a user command receiving unit which receives a search command,
   wherein if the user command receiving unit receives the search command, the control unit compares a screen searched according to the search command with at least one of the stored extracted images of the plurality of the previously searched screens, and displays the search information or at least one of the extracted images in the search information, on the screen searched according to the search command if the screen searched according to the search command is similar to the at least one of the extracted images.

16. The apparatus according to claim 11, wherein the plurality of the previously searched screens comprise screens which are searched using a keyword.

17. The apparatus according to claim 16, wherein the control unit stores the generated search information along with the keyword in the storage unit.

18. The apparatus according to claim 11, wherein the control unit extracts the portion of the plurality of the previously searched screens in a reverse order from a search result screen to an initial search screen.

19. The apparatus according to claim 11, wherein the control unit extracts the portion of the plurality of the previously searched screens during a period of time preceding a time when the search result screen is extracted.

20. The apparatus according to claim 11, wherein the extracted screen comprises a portion of a view of a previously searched screen which is displayed for a longest period of time.

21. A method of generating and displaying an image search history of contents from a selected hierarchical sequence of screens displayed on an apparatus, comprising:
   extracting respective screen images of the screens in a reverse order of the selected hierarchical sequence;
   storing the extracted respective screen images after each extraction thereof;
   generating the image search history of the contents using the stored respective screen images in the selected hierarchical sequence;
   in a subsequent search, comparing image contents of search screens of the subsequent search with the contents in the image search history; and
   if the image contents of the search screens of the subsequent search are similar to the contents in the image search history, displaying the image search history including respective screen images similar to image contents of the subsequent search screens.

22. The method of claim 21, wherein extracting of the respective screen images includes:
   identifying a hierarchically higher screen based on screen information of a current screen; and
   extracting the screen image of the hierarchically higher screen.

23. The method of claim 21, wherein the subsequent search of the contents is performed through search screens via information items of the search screens linked to subsequent search screens by using the generated image search history as a guide,
   wherein, stored respective screen images that are determined similar to the information items of the search screens are displayed in a vicinity of the information items of the search screens.

24. The method of claim 21, further comprising storing the generated image search history of the contents for later use in reaching a final screen of the hierarchical sequence of screens.

25. The method of claim 21, wherein each of the hierarchical sequence of screens is a linked webpage displayed on a display of the apparatus.

26. An apparatus used to generate and display an image search history of contents from a selected hierarchical sequence of screens displayed on the apparatus, comprising:
   a display to display the selected hierarchical sequence of screens;
   a nonvolatile storage unit; and
   a controller to extract respective screen images of the screens in a reverse order of the selected hierarchical sequence, control storage of the extracted respective screen images after each extraction thereof in the storage unit, and generate the image search history of the contents using the stored respective screen images in the selected hierarchical sequence,
   wherein each of the screen images comprises a whole screen image displayed on the apparatus, and wherein, in a subsequent search, the controller compares image contents of search screens of the subsequent search with the contents in the image search history and, if the image contents of the search screens of the subsequent search are similar to the contents in the image search history, displays the image search history including respective screen images similar to image contents of the subsequent search screens.

27. The apparatus of claim 26, wherein in extracting of the respective screen images, the controller further identifies a hierarchically higher screen based on screen information of a current screen, and extracts the screen image of the hierarchically higher screen.

28. The apparatus of claim 26, wherein the controller performs the subsequent search of the contents through search screens via information items of the search screens linked to subsequent search screens by using the generated image search history as a guide, and displays stored respective screen images that are determined similar to the information items of the search screens in a vicinity of the information items of the search screens.

29. The apparatus of claim 26, wherein the controller stores the generated image search history of the contents for later use in reaching a final screen of the hierarchical sequence of screens.

30. The apparatus of claim 26, wherein each of the hierarchical sequence of screens is a linked webpage.

* * * * *